United States Patent [19]

Bonta et al.

[11] Patent Number: 5,740,526
[45] Date of Patent: Apr. 14, 1998

[54] METHOD AND APPARATUS FOR SELECTING TWO ANTENNAS FROM WHICH TO RECEIVE A COMMUNICATION SIGNAL

[76] Inventors: Jeffrey D. Bonta, 1300 E. Mayfair, Arlington Heights, Ill. 60004; Dennis Ray Schaeffer, 266 Mohawk Trail, Buffalo Grove, Ill. 60089

[21] Appl. No.: 252,481

[22] Filed: Jun. 1, 1994

[51] Int. Cl.$^6$ ................................................. H04B 1/06
[52] U.S. Cl. ...................... 455/277.2; 455/134; 455/135; 455/272; 375/347
[58] Field of Search ......................... 455/33.1, 33.3, 455/56.1, 101, 132, 133, 134, 135, 272, 277.1, 277.2, 140; 375/347

[56] References Cited

U.S. PATENT DOCUMENTS

| | | | |
|---|---|---|---|
| 4,977,616 | 12/1990 | Linder et al. | 455/277 |
| 5,119,501 | 6/1992 | Perry et al. | |
| 5,203,024 | 4/1993 | Yamao | 455/277.1 |
| 5,375,259 | 12/1994 | Lee | 455/134 |

FOREIGN PATENT DOCUMENTS

| | | |
|---|---|---|
| 0318665A2 | 6/1989 | European Pat. Off. . |
| 0454368A2 | 10/1991 | European Pat. Off. . |
| 9213399 | 8/1992 | WIPO ................................. 455/272 |

OTHER PUBLICATIONS

Daniel R. Tayloe "Space Diversity Hopping For Digital Data Transmission" Motorola Technical Developments vol. 10, Mar. 1990, Motorola, Inc. pp. 62–63.

Yashushi Yamao and Yoshinori Nagao "Predictive Antenna Selection Diversity (PASD) For TDMA Mobile Radio" 1991 IEEE International Conference on Communications vol. 46, Mar. 1991 pp. 1480–1484.

*Primary Examiner*—Reinhard J. Eisenzopf
*Assistant Examiner*—Doris To
*Attorney, Agent, or Firm*—Jeffrey G. Toler; Raymond J. Warren

[57] ABSTRACT

A base site (100) employs a method and apparatus for selecting two of a plurality of antennas (101–106) from which to receive a communication signal. A first signal quality metric is measured for a communication signal received from a first antenna (102) and a second signal quality metric is measured for the communication signal received from a second antenna (103). When the first signal quality metric differs from the second signal quality metric by a threshold, a signal receiver (113) is coupled to a third antenna (e.g., 101) and a third signal quality metric is measured for the communication signal received from the third antenna (101). Based on the three signal quality metrics, a primary antenna and a secondary antenna are selected from which to receive the communication signal.

17 Claims, 3 Drawing Sheets

NOMINAL 60° SECTOR BOUNDARIES

METHOD AND APPARATUS FOR SELECTING TWO ANTENNAS FROM WHICH TO RECEIVE A COMMUNICATION SIGNAL

FIELD OF THE INVENTION

The present invention relates generally to base sites that incorporate diversity receivers and, in particular, to a method and apparatus for selecting two of a plurality of antennas at a base site from which to receive a communication signal.

BACKGROUND OF THE INVENTION

Cellular communication systems are known to include base sites that have a plurality of receiving antennas. Each base site services a corresponding coverage area, or cell, that is typically divided into multiple regions, or sectors. Each sector is typically served by one or more of the base site receiving antennas. For example, in a six sector cell, each sector is typically served by one directional receiving antenna at the base site. However, since multipath fading is a prominent phenomenon in two-way communication environments, the base site typically employs a diversity technique, such as selection diversity, to account for the multipath fading of an incoming communication signal. When using selection diversity, a second receiving antenna is chosen to serve each sector. In the six sector cell above, the second antenna of a particular sector is typically the directional antenna of an adjacent sector. Thus, the two antennas serving the particular sector comprise an antenna directed into the particular sector and an antenna directed into a sector adjacent to the particular sector. The two antennas serving a particular sector are generally referred to as the primary antenna and the secondary antenna, wherein the primary antenna is the antenna that receives the signal having the better signal quality (e.g., higher received signal strength).

As is also known, selection diversity requires a diversity receiver having two or more signal receiver branches. In the case of two signal receiver branches, each signal receiver branch is coupled to a corresponding one of the two serving antennas. Thus, the primary antenna is coupled to one signal receiver branch, while the secondary antenna is coupled to the other signal receiver branch. In a normal configuration, the diversity receiver uses the signal received by the primary antenna for audio processing and monitors the signal quality of the signal received by the secondary antenna. When the signal quality of the signal received by the secondary antenna becomes better than the signal quality of the signal received by the primary antenna, the diversity receiver selects the signal received by the secondary antenna for audio processing and monitors the signal quality of the signal received by the primary antenna (i.e., the old secondary antenna becomes the new primary antenna and vice versa).

During a communication, a mobile communication unit (e.g., a cellular telephone) typically travels throughout the cell serviced by a particular base site. Accordingly, the primary and secondary antennas serving the communication are subject to change as the communication unit varies its location in the cell. To determine which antennas should be used to provide diversity at a particular time, a base site normally includes a plurality of dedicated scanning receivers that are used to measure the signal qualities of the communication signals received by the antennas that are not currently serving the communication. Although dedicated scanning receivers provide accurate selection of new primary and secondary antennas, their presence within the base site configuration increases the complexity and cost of the base site.

An alternative approach to using scanning receivers is to periodically use the signal receiver branch coupled to the current secondary antenna to monitor the signal qualities of the signals received by the alternate antennas at the base site. This approach is detailed in European Patent Application No. 91303508.5, published by the European Patent Office on Oct. 30, 1991 under publication number 0454368A2 and incorporated herein by reference. Although this technique eliminates the need for dedicated scanning receivers at the base site, it uses the aforementioned signal receiver branch at periodic time intervals regardless of the signal quality of the communication signal received by the signal receiver branch coupled to the current primary antenna. Thus, this approach ignores the direction and rate of change of the signal quality being received by the primary antenna, thereby making the signal received by the diversity receiver susceptible to diversity degradation., especially when the signal quality of the signal received by the primary antenna is rapidly decreasing prior to coupling the selected signal receiver branch to the alternate antennas.

Therefore, a need exists for a method and apparatus for selecting two of a plurality of antennas at a base site from which to receive a communication signal that obviate the need for dedicated scanning receivers at the base site, while minimizing the diversity receiver's susceptibility to diversity degradation during the alternate antenna scanning process. Further, such a method and apparatus that maximized the time for monitoring the alternate antennas would be an improvement over the prior art.

DESCRIPTION OF A PREFERRED EMBODIMENT

Generally, the present invention encompasses a method and apparatus for selecting two of a plurality of antennas at a base site from which to receive a communication signal. A diversity receiver contained at the base site includes a first signal receiver and a second signal receiver. The first signal receiver receives the communication signal from a first antenna and the second signal receiver receives the communication signal from a second antenna. The diversity receiver then measures a first signal quality metric for the communication signal received from the first antenna and a second signal quality metric for the communication signal received from the second antenna. When the first signal quality metric differs from the second signal quality metric by a threshold, the second signal receiver is coupled to a third antenna and the diversity receiver measures a third signal quality metric for the communication signal received from the third antenna. Based on the three signal quality metrics, the diversity receiver selects a primary and a secondary antenna from which to receive the communication signal. By selecting the primary and secondary antennas in this manner, the present invention maximizes the amount of time that the second signal receiver can be used to measure the signal quality of communication signals received from additional antennas without introducing a significant degradation in the diversity performance of the diversity receiver.

Figure 1:
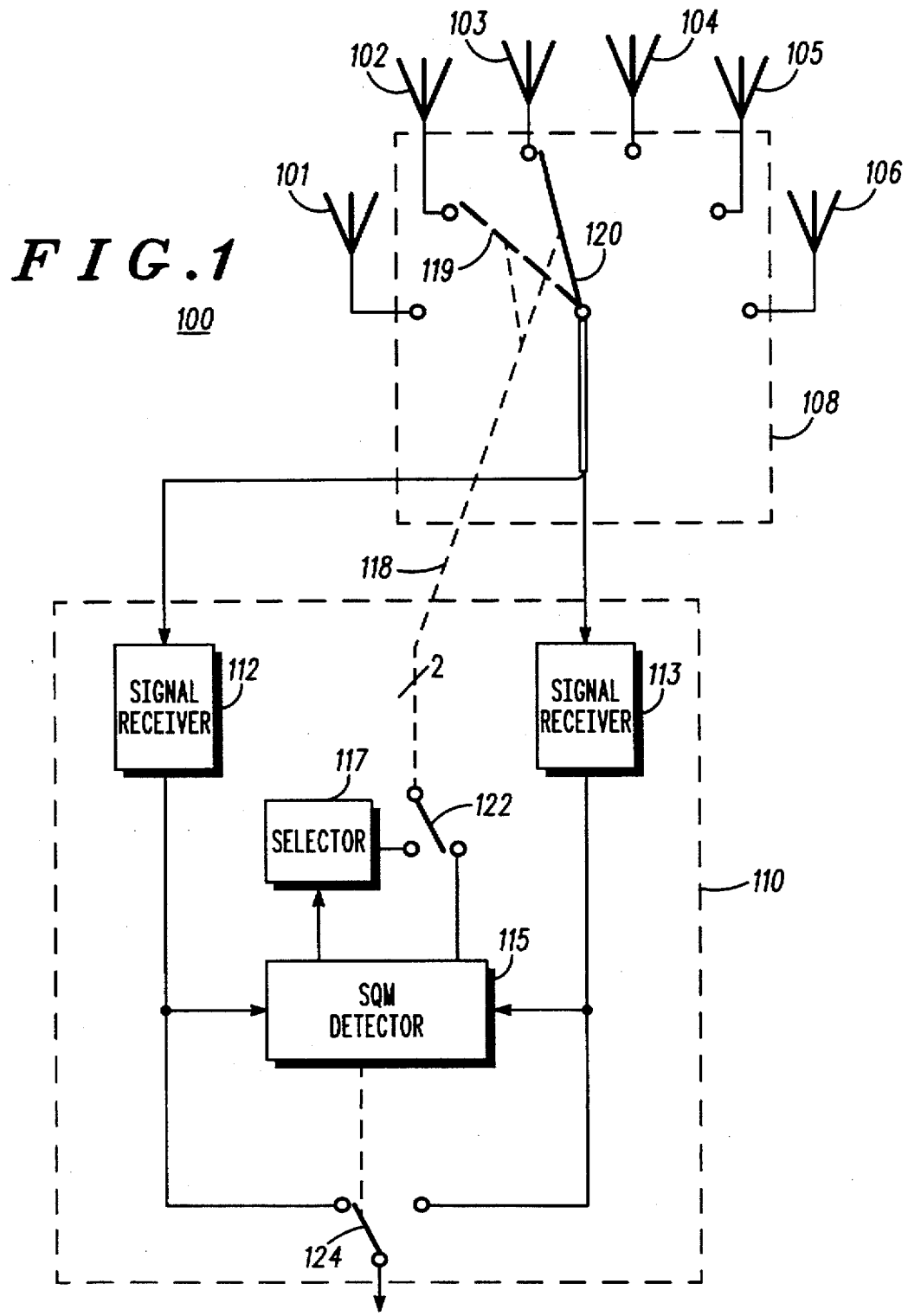
FIG. 1 illustrates a base site in accordance with a preferred embodiment of the present invention.

The present invention can be more fully described with reference to FIGS. 1–3. FIG. 1 illustrates a base site 100 that includes a plurality of antennas 101–106, a switch matrix 108, and a diversity receiver 110, in accordance with a preferred embodiment of the present invention. The diversity receiver 110 includes two signal receivers 112, 113, a signal quality metric (SQM) detector 115, an antenna selector 117, and two switches 122, 124. As shown, the switch matrix 108 includes electronically controllable switches 119, 120 that couple the antennas (e.g., 102, 103) to the signal receivers 112, 113.

Each of the antennas 101–106 preferably comprises a directional antenna having an antenna pattern with a half-power beamwidth of approximately 60 degrees. However, in an alternate embodiment, each antenna 101–106 might have an antenna pattern with a half-power beamwidth of any angle in the 0 to 120 degree range. It should be noted that the number of antennas 101–106 used at the base site 100 depend on the antenna patterns of the particular antennas 101–106. Thus, the number of antennas 101–106 shown in FIG. 1 might be increased or decreased depending on the desired antenna configuration.

In a preferred embodiment, the switch matrix 108 comprises a single receive antenna switch matrix that facilitates the connection of all six antennas 101–106 to each of the signal receivers 112, 113. In an alternate embodiment, the switch matrix 108 might comprise two receive antenna switch matrices, wherein each antenna switch matrix facilitates the connection of each signal receiver 112, 113 to three of the six antennas 101–106. For example, a first receive antenna switch matrix might be used to couple antennas 101,103, and 105 to the signal receiver 112, while a second receive antenna switch matrix might be used to couple antennas 102, 104, and 106 to the signal receiver 113. The switches 119, 120 contained within the switch matrix 108 preferably comprise well-known PIN diode switching circuits.

Each of the signal receivers 112, 113 comprise well-known receiver front-end and back-end circuitry, such as filters, frequency down-converters, analog-to-digital converters, and signal processing circuitry (e.g., a microprocessor or a digital signal processor). The SQM detector 115 and the selector 117 are preferably implemented using a digital signal processor, although other types of signal processing devices—such as an analog-to-digital converter in conjunction with a microprocessor—might alternatively be used.

General operation of the base site 100 occurs in the following manner. For this discussion, it is assumed that signal receiver 112 is initially receiving a communication signal from antenna 102 and signal receiver 113 is initially receiving the communication signal from antenna 103. The communication signal preferably comprises a frequency division multiple access (FDMA) signal. In one alternate embodiment, the communication signal might comprise digitally modulated time division multiple access (TDMA) signal, such as the type of signal set forth in the standards of the Groupe Special Mobile (GSM) Pan-European cellular system, the United States Digital Cellular (USDC) system (i.e., IS-54), and the Personal Digital Cellular (PDC) system. In yet another alternate embodiment, the communication signal might comprise a code division multiple access (CDMA) signal, such as the type of signal set forth in the IS-95 cellular standard.

Upon receiving their respective communication signals, the signal receivers 112, 113 provide demodulated samples of the signals to the SQM detector 115. The SQM detector 115 measures a signal quality metric, such as a received signal strength indication (RSSI), bit error rate, or a carrier-to-interference plus noise ratio, for the communication signal received by each signal receiver 112, 113. Based on the measured signal quality metrics, the SQM detector 115 directs switch 124 to select the communication signal having the better signal quality (e.g., the signal from antenna 102) for further audio processing at the base site 100 in accordance with well-known selection diversity techniques. The antenna 102 that provides the better signal quality is referred to as the primary antenna, while the antenna 103 used for diversity is referred to as the secondary antenna.

When the signal quality metric (e.g., RSSI) for the communication signal received from the primary antenna 102 exceeds, or otherwise differs from, the signal quality metric for the communication signal received from the secondary antenna 103 by a threshold (e.g., 1 dB), the SQM detector 115 directs switch 119, via one of the control lines 118, to begin coupling the other antennas 101, 104–106 to signal receiver 113. The difference in signal quality metrics indicates that the communication signal incident on the secondary antenna 103 is in a fade as compared to the communication signal incident on the primary antenna 102. Thus, the communication signal received from the primary antenna 102 continues to be used for audio processing, while signal receiver 113 is used to obtain signal quality information for the signals received by the other antennas 101, 104–106. It should be noted that in an alternate embodiment the diversity receiver 110 might further include a third signal receiver (not shown) that is activated when the threshold value is attained. The third signal receiver would be used to measure the signal quality metrics for the communication signals received from the alternate antennas 101, 104–106 instead of using signal receiver 113.

To control switch 119, the SQM detector 115 preferably provides a direct current control voltage 118 that activates the PIN diode corresponding to the antenna from which signal receiver 113 is to receive the communication signal. For example, when signal receiver 113 is to receive the communication signal from antenna 101, the voltage applied to the PIN diode coupling antenna 102 to signal receiver 113 might be removed or reduced to disconnect antenna 102, while a positive voltage might be applied to the PIN diode associated with antenna 101 to couple antenna 101 to signal receiver 113. In this manner, switch 119 effectively switches which antenna is coupled to signal receiver 113. In an analogous manner, switch 120 can be controlled to couple other antennas to signal receiver 112.

The amount of time that signal receiver 113 is used to monitor the other antennas 101, 104–106 preferably depends on the difference between the signal quality metrics associated with the signals received from the primary and secondary antennas 102, 103. For example, if the RSSI for the communication signal received from the primary antenna 102 is 3 dB better, on average, than the RSSI for the communication signal received from the secondary antenna 103, the available signal receiver 113 might monitor the signals received from the other antennas 101, 104–106 for a duration of at least 15 milliseconds (ms) without significantly degrading diversity performance of the diversity receiver 110. Since the time required to switch from one antenna to another and obtain an RSSI measurement is approximately 2 ms, the 15 ms available represents sufficient time to perform RSSIs on the communication signals received from all four alternate antennas 101, 104–106. However, if the average difference between the RSSI for the communication signal received from the primary antenna 102 and the RSSI for the communication signal received from the secondary antenna 103 is larger (e.g., greater than 3 dB), a longer duration of time is available for monitoring the alternate antennas 101, 104–106, while a smaller average difference (e.g., less than 3 dB) corresponds to monitoring less than all the alternate antennas 101, 104–106. The amount of time might alternatively depend on the level crossing rate of the communication signal received from the primary antenna 102, as later described.

As switch 119 couples the other antennas 101, 104–106 to signal receiver 113, the SQM detector 115 measures and stores the signal quality metrics associated with the communication signals received from those antennas 101, 104–106. When the time for monitoring the alternate antennas 101, 104–106 expires, the SQM detector 115 provides the measured signal quality metrics to the selector 117. In a preferred embodiment, the selector 117 compares the signal quality metrics and selects the antenna receiving the communication signal with the best signal quality metric as the new primary antenna and the antenna serving one of the sectors adjacent to that served by the primary antenna having the better signal quality metric as the new secondary antenna. Depending on the movement of the signal source (e.g., a mobile or portable radiotelephone), the new primary and secondary antennas might remain the original primary and secondary antennas (i.e., 102, 103). In an alternate embodiment, the selector 117 might average the signal quality metrics received from the SQM detector 115 over several consecutive measurement cycles prior to selecting the new primary and secondary antennas. In a further embodiment, the selector 117 might select the antenna receiving the communication signal with the second best signal quality metric as the new secondary antenna instead of requiring the new secondary antenna to be an antenna serving a sector adjacent to that served by the new primary antenna.

Upon selection of the new primary and secondary antennas, switch 122 couples the selector 117 to the control lines 118. The selector 117 then provides appropriate control signals—DC voltages in this particular embodiment—to instruct switches 119, 120, to couple the new primary and secondary antennas to the signal receivers 112, 113 for continued reception of the communication signal.

Figure 2:
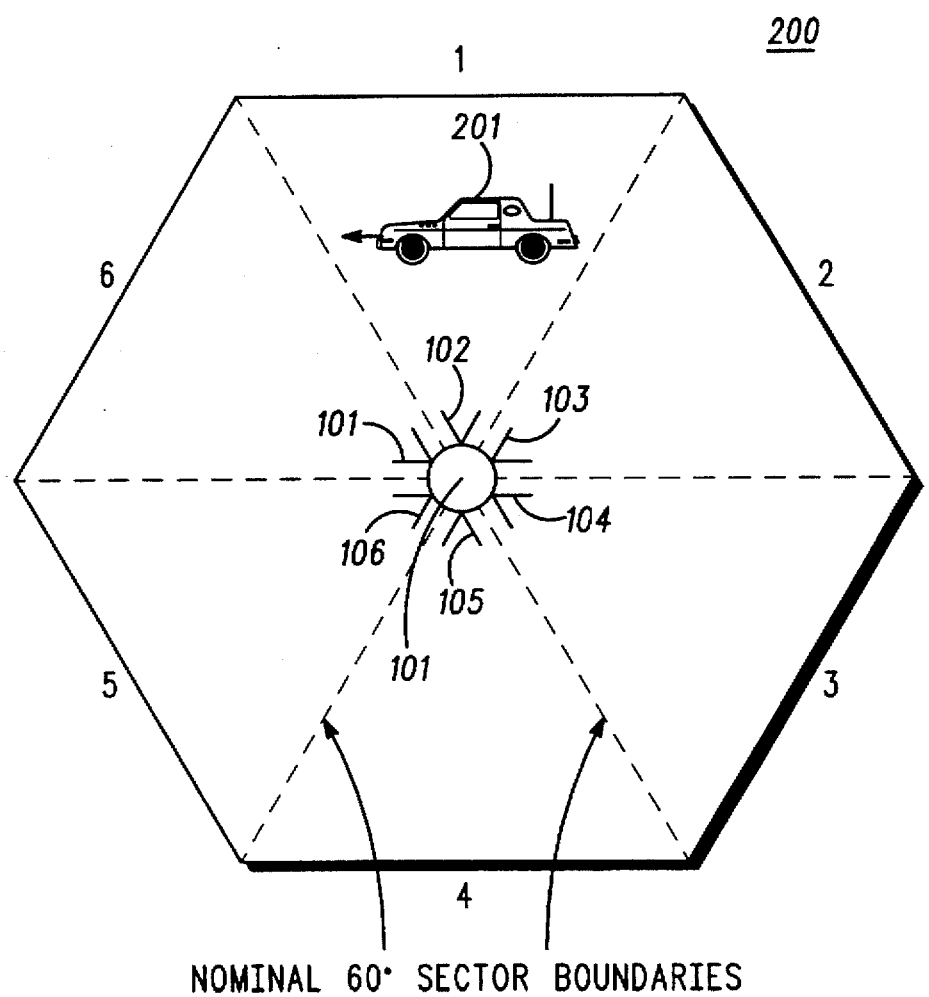
FIG. 2 illustrates a multi-sectored coverage area serviced by the base site of FIG. 1.

FIG. 2 illustrates a preferred coverage area 200 serviced by the base site 100 of FIG. 1. As shown, the coverage area 200 has a hexagonal geometry and is divided into six sectors (1–6). Each sector occupies approximately 60 degrees of the complete coverage area 200 and is serviced by a primary antenna and a secondary antenna. For example, a communication unit 201 (e.g., a mobile radiotelephone) residing in sector 1 might be serviced by primary antenna 102 and secondary antenna 103 prior to moving in the direction of the arrow.

To further describe the methodology of the present invention, it is assumed that the communication unit 201 is moving in the direction of the arrow and is currently being serviced by primary antenna 102 and secondary antenna 103. As discussed above, when the communication signal received from the secondary antenna 103 has a signal quality metric inferior to the signal quality metric of the communication signal received from the primary antenna 102 by a threshold value, the signal receiver initially using the secondary antenna 103 is coupled to the alternate antennas 101, 104–106 for a period of time based on the signal quality metric differential. After obtaining signal quality metrics for the communication signals received from the alternate antennas 101, 104–106, the two antennas providing the best signal quality metrics are selected and coupled to the signal receivers. For instance, if the communication unit 201 traveled near the boundary between sector 1 and sector 6 during the measurement time and the signal received from antenna 102 has the best signal quality, while the signal received from antenna 101 has the second best signal quality, antenna 101 now becomes the new secondary antenna and antenna 102 remains the primary antenna. However, if during a subsequent antenna scanning procedure the communication unit 201 enters into sector 6 and the signal received from antenna 101 has the best signal quality, while the signal received from antenna 102 has the second best signal quality, antenna 101 becomes the new primary antenna and antenna 102 becomes the new secondary antenna.

It should be noted that although the above discussion has focused on the present invention's application in a six sector cell, the methodology disclosed herein is equally applicable in a three sector cell. In the three sector cell, each sector occupies 120 degrees of the complete coverage area 200 and is preferably served by two diversity antennas (i.e., a primary and a secondary) per sector, both antennas being directed into their particular sector. In this case, when the communication signal received from the secondary antenna has a signal quality metric inferior to the signal quality metric of the communication signal received from the primary antenna by a threshold value, the signal receiver initially using the secondary antenna is coupled to the alternate antennas (i.e., the antennas directed into and serving the other two 120 degree sectors) for a period of time based on the signal quality metric differential, as discussed above. When the signal quality metric for a particular one of the alternate antennas is superior to the signal quality metric of the primary antenna, the particular alternate antenna becomes the new primary antenna and the diversity antenna serving the same sector as the new primary antenna becomes the new secondary antenna.

The present invention provides an antenna scanning technique by which a secondary signal receiver in a diversity receiver can be used to monitor the signal quality of communication signals received from alternate antennas. In contrast to the prior art, which periodically uses the secondary signal receiver to monitor alternate antennas regardless of the signal quality difference between the signals received at the primary and secondary signal receivers, the present invention utilizes the secondary signal receiver only when a sufficient difference exists between the signal qualities of the communication signals received by the primary and secondary signal receivers. In this manner, the present invention reduces the potential for degraded signal quality of the signal received at the primary signal receiver that might result from fading of the signal during the time interval for monitoring the alternate antennas.

Figure 3:
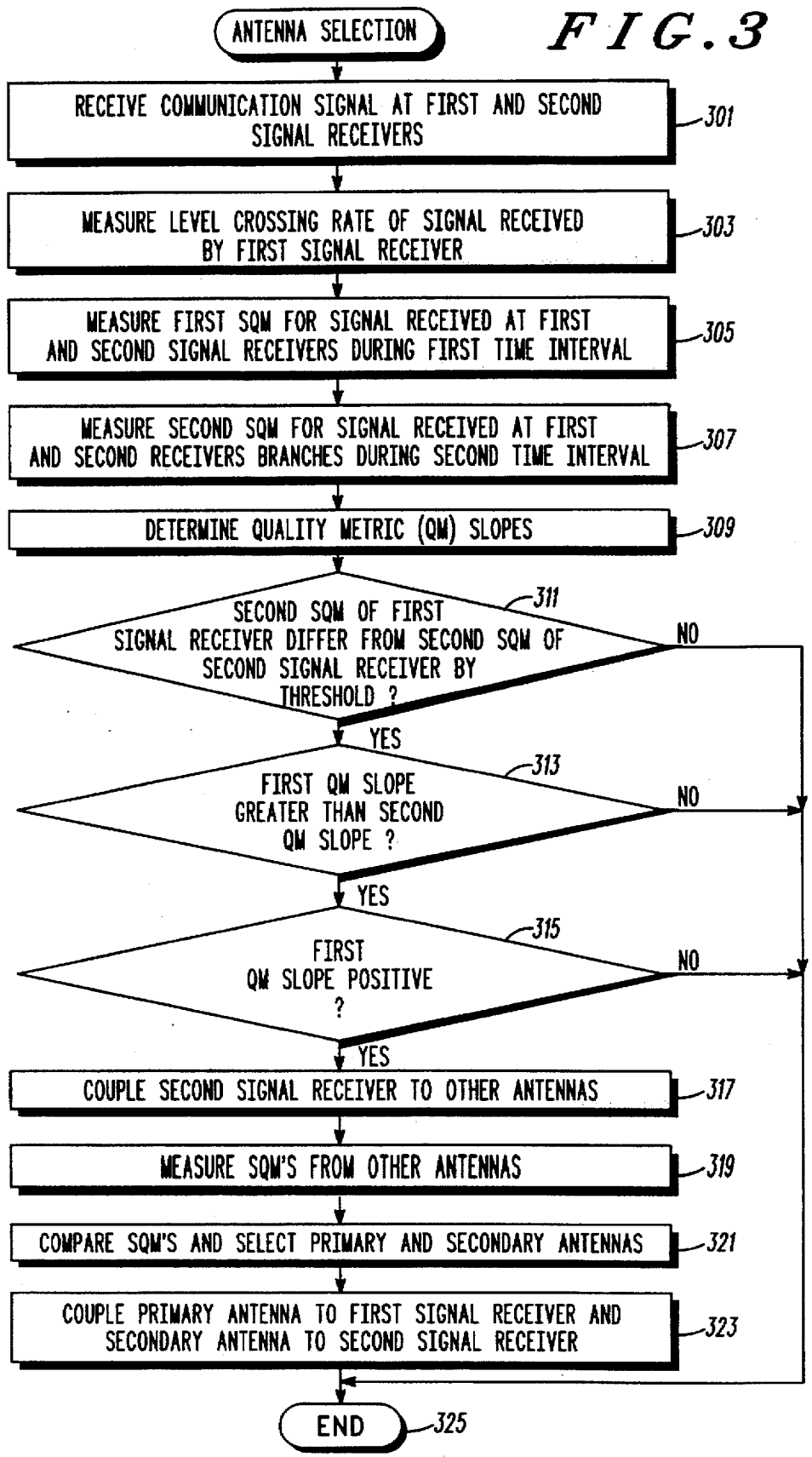
FIG. 3 illustrates an exemplary logic flow diagram of steps executed by a diversity receiver in accordance with the present invention.

FIG. 3 illustrates an exemplary logic flow diagram of steps executed by a diversity receiver in accordance with the present invention. Similar to the discussion above, a base site includes a plurality of antennas and a diversity receiver having two signal receivers. A communication signal is received (301) at a first signal receiver from a first antenna and at a second signal receiver from a second antenna. It is assumed for the purposes of this discussion that the first antenna is the current primary antenna and the second antenna is the current secondary antenna. The diversity receiver then measures (303) a level crossing rate of the communication signal received at the first signal receiver. As is known in the art, the level crossing rate is the number of times the amplitude of a received communication signal passes through a threshold value (e.g., the anticipated root mean square level of the signal) in an increasing, positive sense per unit of time (e.g., per second). The level crossing rate provides a means for approximating the speed of a communication unit traveling within the coverage area of the base site.

In addition to measuring the level crossing rate of the signal received at the first signal receiver, the diversity receiver measures (305) a first signal quality metric (e.g., RSSI) for the signals received at the first and second signal receivers during a first time interval. Thus, the diversity receiver measures two signal quality metrics (SQMs), one for each signal received at each signal receiver. In a preferred embodiment, the measuring time interval is approximately 500 microseconds. In a similar manner, the diversity receiver then measures (307) a second signal quality metric for the signals received at the first and second signal receivers during a second time interval. In a preferred embodiment, the second time interval comprises the 500 microsecond interval succeeding the first time interval.

Upon obtaining the signal quality metrics for the signals received at the signal receivers during the two time intervals, the diversity receiver determines (309) quality metric slopes for each signal receiver. The quality metric (QM) slopes are determined by subtracting the signal quality metric measured during the first time interval from the respective signal quality metric measured during the second time interval. That is, QM slope$_1$=SQM$_1$(second interval)–SQM$_1$(first interval)
and QM slope$_2$=SQM$_2$(second interval)–SQM$_2$(first interval), where the subscript corresponds to the particular signal receiver. The slopes indicate whether the signal quality of the signals received at each signal receiver is improving or degrading. Thus, the greater the quality metric slope, the better the anticipated signal quality of the received signal.

After measuring the QM slopes, the diversity receiver determines (311) whether the signal quality metrics measured during the second time interval differ by a threshold. In a preferred embodiment, this determination constitutes comparing the RSSI measured for each signal during the second time interval and determining whether the RSSI for the signal received from the current primary antenna is greater than the RSSI for the signal received from the current secondary antenna by the threshold, as described above. When this condition is satisfied, the diversity receiver determines (313) whether the first quality metric slope is greater than the second quality metric slope. A numerically greater first quality metric slope indicates that the signal quality of the signal received by the current secondary antenna is either degrading relative to, degrading to a lesser degree than, or improving to a lesser degree than, the signal quality of the signal received by the current primary antenna. For example, if QM slope$_1$=–3 and QM slope$_2$=–7, then the signal quality of the signal received by the current primary antenna is degrading to a lesser degree than is the signal quality of the signal received by the current secondary antenna. In a similar manner, if QM slope$_1$=5 and QM slope$_2$=3, then the signal quality of the signal received by the current secondary antenna is improving to a lesser degree than is the signal quality of the signal received by the current primary antenna.

When the first quality metric slope is greater than the second quality metric slope, the diversity receiver determines (315) whether the first quality metric slope is positive. A positive slope indicates that the signal quality of the signal received by the current primary antenna is improving, thereby indicating an opportune time for using the second signal receiver for antenna scanning purposes. In a preferred embodiment, affirmative responses to the decision blocks (311,313,315) are required before the second signal receiver is coupled (317) to the alternate antennas. The affirmative responses indicate that the signals being received by the current secondary antenna are entering a faded condition relative to the signals being received by the current primary antenna. By coupling the second signal receiver to the alternate antennas when the signals being received by the secondary antenna are entering a fade, the present invention can appropriate a maximum amount of time for measuring the signal qualities of the signals received by the other antennas without significantly degrading the diversity performance of the diversity receiver. In the preferred embodiment, if the response to any one of the decision blocks (311,313, 315) is negative, the logic flow ends (325). However, as discussed above with regard to FIG. 1, the present invention also provides improvement over the prior art under less stringent conditions (e.g., when the signal quality of the signal received by the current primary antenna is better than the signal quality of the signal received by the current secondary antenna by a threshold and/or when the quality metric slope associated with the signal received by the current primary antenna is greater than the quality metric slope associated with the signal received by the current secondary antenna).

When the three conditions (311, 313, 315) are met, the second signal receiver is de-coupled from the current secondary antenna and sequentially coupled (317) to the alternate receive antennas at the base site. The length of time that the second signal receiver remains coupled to the alternate antennas might depend on the signal quality metric differential, as discussed with regard to FIG. 1, or on the level crossing rate of the signal received at the first signal receiver. In the latter case, a higher level crossing rate corresponds to a shorter amount of time with which to monitor the alternate antennas. Upon coupling the second signal receiver to the alternate antennas, the diversity receiver measures (319) signal quality metrics (e.g., RSSI) for the signals received by the alternate antennas. Upon expiration of the alternate antenna measurement period, the diversity receiver then compares (321) the signal quality metrics from all measured antennas and selects (321) the antenna that provides the signal with the highest signal quality metric as the new primary antenna and the antenna that provides the signal with the second highest signal quality metric as the new secondary antenna. Depending on the particular circumstances (e.g., speed of the communication unit), this selection might not result in a change of primary and secondary antennas.

Once the new primary and secondary antennas are selected, the first signal receiver is coupled (323) to the new primary antenna and the second signal receiver is coupled (323) to the new secondary antenna. However, in an alternate embodiment, the second signal receiver might be coupled to the new primary antenna, while the first signal receiver is coupled to the new secondary antenna. The diversity receiver then continues to receive the communication signal using the new primary and secondary antennas and the logic flow ends (325).

The present invention encompasses a method and apparatus for selecting two of a plurality of antennas from which to receive a communication signal. With this invention, one signal receiver branch of a two branch diversity receiver can be used to receive a communication signal from a primary antenna, while the other signal receiver branch is efficiently used to monitor the signal quality of signals received by the other antennas without introducing a significant degradation to the diversity performance of the diversity receiver. In contrast to the periodic scanning techniques of the prior art, the present invention requires the signal quality of the signal received by the one signal receiver to differ by a threshold from the signal quality of the signal received by the other signal receiver before the scanning operation is performed. In this manner, the present invention provides a higher probability that the signal being received and used for processing by the diversity receiver will remain at a sufficient signal quality level while the selected signal receiver monitors the other antennas in an attempt to identify the two optimal antennas from which to continue receiving the communication signal. Further, by basing the decision to couple the selected signal receiver to the other antennas on a relative signal quality differential, the present invention provides for a maximum amount of time for monitoring the other antennas while maintaining diversity performance.

What is claimed is:

1. At a base site containing at least two signal receivers and a plurality of antennas, a method of receiving a communication signal comprising the steps of:
   a) measuring a first signal quality metric for the communication signal received from a first antenna of the plurality of antennas and a second signal quality metric for the communication signal received from a second antenna of the plurality of antennas; and
   b) coupling, when the first signal quality metric differs from the second signal quality metric by a threshold, a signal receiver of the at least two signal receivers to a third antenna of the plurality of antennas for a predetermined period of time based on the difference between the first signal quality metric and the second signal quality metric.

2. The method of claim 1, wherein the first signal quality metric comprises a first received signal strength indication and the second signal quality metric comprises a second received signal strength indication.

3. The method of claim 2, further comprising measuring a third signal quality metric for the communication signal received from the third antenna wherein the third signal quality metric comprises a third received signal strength indication.

4. The method of claim 1, further comprising the steps of:
   c) coupling a first signal receiver of the at least two signal receivers to a primary antenna of the plurality of antennas and a second signal receiver of the at least two signal receivers to a secondary antenna of the plurality of antennas based on the measured signal quality metrics.

5. The method of claim 1, wherein step (a) comprises the steps of:
   a1) measuring a first value of the first signal quality metric and the second signal quality metric during a first time interval;
   a2) measuring a second value of the first signal quality metric and the second signal quality metric during a second time interval;
   a3) subtracting the first value of the first signal quality metric from the second value of the first signal quality metric to produce a first quality metric slope; and
   a4) subtracting the first value of the second signal quality metric from the second value of the second signal quality metric to produce a second quality metric slope.

6. The method of claim 1, further comprising the step of measuring a level crossing rate for the communication signal received from the first antenna.

7. The method of claim 6, wherein step (b) further comprises the step of coupling the signal receiver to the third antenna for a predetermined period of time based on the level crossing rate.

8. At a base site containing a diversity receiver and a plurality of antennas, the diversity receiver including a first signal receiver and a second signal receiver, a method receiving a communication signal comprising the steps of:
   a) receiving, at the first signal receiver, the communication signal from a first antenna of the plurality of antennas;
   b) receiving, at the second signal receiver, the communication signal from a second antenna of the plurality of antennas;
   c) measuring a first value of the first signal quality metric for the communication signal received from the first antenna and a first value of the second signal quality metric for the communication signal received from the second antenna during a first time interval;
   d) measuring a second value of the first signal quality metric for the communication signal received from the first antenna and a second value of the second signal quality metric for the communication signal received from the second antenna during a second time interval;
   e) subtracting the first value of the first signal quality metric from the second value of the first signal quality metric to produce a first quality metric slope;
   f) subtracting the first value of the second signal quality metric from the second value of the second signal quality metric to produce a second quality metric slope; and
   g) coupling, when the second value of the first signal quality metric differs from the second value of the second signal quality metric by a threshold and when the first quality metric slope is greater.

9. The method of claim 8, wherein step (g) further comprises the step of, when the first quality metric slope is positive, coupling the second signal receiver to the third antenna.

10. The method of claim 8, further comprising the step of measuring a level crossing rate for the communication signal received at the first signal receiver.

11. The method of claim 10, wherein step (g) further comprises the step of coupling the second signal receiver to the third antenna for a predetermined period of time based on the level crossing rate.

12. A base site comprising:
   a plurality of antennas;
   a first signal receiver, coupled to a first antenna of the plurality of antennas, that receives a communication signal;
   a second signal receiver, coupled to a second antenna of the plurality of antennas, that receives the communication signal;
   detector means, coupled to the first signal receiver and the second signal receiver, for measuring a first signal quality metric for the communication signal received at the first signal receiver and a second signal quality metric for the communication signal received at the second signal receiver; and
   switching means, coupled to the plurality of antennas, the second signal receiver and the detector means, for coupling the second signal receiver to a third antenna of the plurality of antennas when the first signal quality metric differs from the second signal quality metric by a threshold.

13. The base site of claim 12, wherein the switching means is further coupled to the first signal receiver, the base site further comprising selection means, coupled to the detector means and the switching means, for directing the switching means to couple the first signal receiver to a primary antenna of the plurality of antennas and the second signal receiver to a secondary antenna of the plurality of antennas based on measured signal quality metrics.

14. The base site of claim 13, wherein the selection means comprises a receive antenna matrix switch.

15. The base site of claim 12, wherein each of the plurality of antennas comprises a directional antenna having an antenna pattern with a half-power beamwidth of approximately 60 degrees.

16. The base site of claim 12, wherein the detector means comprises a digital signal processor.

17. A base site comprising:

a plurality of antennas;

a first signal receiver, coupled to a first antenna of the plurality of antennas, that receives a communication signal;

a second signal receiver, coupled to a second antenna of the plurality of antennas, that receives the communication signal;

a signal quality metric detector, coupled to the first signal receiver and the second signal receiver, for measuring a first signal quality metric for the communication signal received at the first signal receiver and a second signal quality metric for the communication signal received at the second signal receiver;

a switch matrix, coupled to the plurality of antennas, the first signal receiver, the second signal receiver, and the signal quality metric detector, for coupling the second signal receiver to a third antenna of the plurality of antennas when the first signal quality metric differs from the second signal quality metric by a threshold; and an antenna selector, coupled to the signal quality metric detector and the switch matrix, for directing the switch matrix to couple the first signal receiver to a primary antenna of the plurality of antennas and the second signal receiver to a secondary antenna of the plurality of antennas based on measured signal quality metrics.

* * * * *